(12) United States Patent
Sotomura

(10) Patent No.: US 6,245,458 B1
(45) Date of Patent: Jun. 12, 2001

(54) COMPOSITE ELECTRODE, METHOD OF PRODUCING THE SAME, AND LITHIUM SECONDARY BATTERY USING THE SAME

(75) Inventor: Tadashi Sotomura, Kashiwara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/211,779

(22) Filed: Dec. 15, 1998

(30) Foreign Application Priority Data

Jan. 28, 1998 (JP) .................................................. 10-015856

(51) Int. Cl.[7] ...................................................... H01M 4/60
(52) U.S. Cl. .................. 429/213; 429/218.1; 429/231.95
(58) Field of Search ................................ 429/213, 231.95, 429/218.1

(56) References Cited

U.S. PATENT DOCUMENTS

| 5,413,882 | * | 5/1995 | Uemachi et al. ...................... 429/213 |
| 5,518,841 | * | 5/1996 | Sotomura et al. ................... 429/213 |
| 5,582,623 | * | 12/1996 | Chu ...................................... 29/623.1 |
| 5,665,492 | * | 9/1997 | Sotomura ............................. 429/213 |

FOREIGN PATENT DOCUMENTS 5-266926 * 10/1993 (JP) .

OTHER PUBLICATIONS

T. Sotomura, et al., "Organo–Sulphur/Polyaniline Composite Cathodes Containing Elementary Sulphur For Rechargeable Polymer Lithium Batteries," *Electrochemical Society Proceedings*, 98–15: 290–98 (1999).
N. Oyama, et al., "Dimercaptan–Polyaniline Composite Electrodes For Lithium Batteries With High Energy Density" *Nature*, 373: 598–600 (1995).
John Elmsley, *The Elements*, p. 180 (1990).

* cited by examiner

Primary Examiner—Laura Weiner
(74) Attorney, Agent, or Firm—Akin, Gump, Strauss, Hauer & Feld, L.L.P.

(57) ABSTRACT

To provide a composite electrode, which does not lose large capacity and high energy density of sulfur and proceeds oxidation-reduction reaction rapidly even at room temperature. There is disclosed in the specification that a composite electrode comprising a composition containing an organic sulfide compound having at least a thiol or thiolate group in the molecule, polyaniline, and sulfur.

3 Claims, 3 Drawing Sheets

COMPOSITE ELECTRODE, METHOD OF PRODUCING THE SAME, AND LITHIUM SECONDARY BATTERY USING THE SAME

BACKGROUND OF THE INVENTION

The present invention relates to a composite electrode containing an organic sulfide compound, which is employed for electrochemical devices such as batteries, electrochromic display devices, sensors, memories and the like, a method for producing the same, and a lithium secondary battery having a cathode comprising the composite electrode.

Since an electrically-conductive polyacetylene was discovered in 1971, an electrode comprising an electrically-conductive polymer has been intensively studied. This is because electrochemical devices such as lightweight batteries with high energy densities, electrochromic devices having large surface areas, biochemical sensors utilizing minute electrodes and the like can be expected to be realized by using the conductive polymer as the electrode material. The polyacetylene however has some disadvantages for practical use in the electrodes because of its chemical instability and, hence, research has been directed to other π electron conjugated conductive polymers, which is relatively stable, such as polyaniline, polypirrole, polyacene, polythiophene and the like. Lithium secondary batteries using these polymers for their cathodes have already been developed. It is said that the energy density of each of these batteries is 40 to 80 Wh/kg. As an organic material which is expected to have a high energy density, there is, for example, an organic sulfide compound having a thiol group or thiolate group in the molecule.

As the organic compound, there is suggested, in U.S. Pat. No. 4,833,048, a compound represented by the formula $M^+—^-S—R—S^-—M^+$ wherein R is an aliphatic or aromatic organic residue, S is a sulfur atom, $M^+$ is a protone or metal cation. Plural of such compound can be bonded together through S—S bond by electrolytic oxidation and polymerized in the form of $M^+—^-S—R—S—S—R—S—S—R—S^-—M^+$. The produced polymer may be returned to the original monomer by electrolytic reduction. A metal-sulfur type rechargeable battery constructed by combining a disulfide type compound with a metal(M), which supplies and captures a cation($M^+$), is proposed in the above-described U.S. Pat. specification. The battery has a energy density of 150 to 200 Wh/kg. Further, sulfur is proposed in U.S. Pat. No. 5,523,179 as the electrode material which gives a high capacity and large energy density of not less than 200 Wh/k.

However, the oxidation-reduction reaction of the sulfur proceeds slowly at room temperature and it is difficult to provide a higher current output. And, when constituting a battery with an anode comprising a metallic lithium, a lower voltage of about 2 V is only provided. Namely, there is a disadvantage that only a lower operating voltage of not higher than 2V may be provided, because the oxidation-reduction reaction proceeds slowly and the resistance to electrode reaction is high when such a battery is operated at room temperature. On the other hand, a lithium battery with a cathode comprising an oxide of a transition metal such as lithium cobaltate or the like provides a high operating voltage of higher than 3.6V. Such a battery, which has a high operating voltage, can operate an electronic device alone. However, when using a battery with a cathode comprising sulfur, it is necessary to connect two batteries in series to raise up the voltage.

On the other hand, among the organic sulfide compounds having a thiol or thiolate group in their molecules, the specified organic disulfide compound as described above gives a battery which provides a high voltage of not lower than 3V if combined with a metallic lithium anode. However, there is a disadvantage that an electrode capacity is decreased gradually as the oxidation-reduction (charge and discharge) of the battery is repeated. The reason for such a phenomenon is regarded as in the followings.

When the organic disulfide compound is oxidized (charged), an electrically-insulating polydisulfide compound which is poor in ionic conductivity is produced. The polydisulfide is poor in solubility to the electrolyte. On the other hand, an organic disulfide monomer, which is produced when the polydisulfide compound is reduced (discharged) to form a monomer, is highly soluble to an electrolyte. Accordingly, a part of the disulfide monomers is dissolved into the electrolyte when the oxidization-reduction is repeated. And, the dissolved monomers are polymerized to deposit at a site other than their original site in the electrode. The deposited polydisulfide compound, which is separated from an electrically conductive agent such as carbon black and polymerized, is apart from the electron/ion conductive network in the electrode and has no relation to the electrode reaction. If the oxidation-reduction is repeated, the number of the parted polydisulfide compounds is increased and the capacity of the battery is gradually decreased. The highly soluble organic disulfide monomer is easy to move and is dispersed from the cathode to a separator or into an electrolyte and, further, to the anode side. Therefore, the battery with the electrode comprising the organic disulfide compound as the cathode has disadvantages that the charging and discharging efficiency is deteriorated and cycle life of the charging and discharging is shortened.

Then the object of the present invention is to solve the above-mentioned problems and to provide a composite electrode, which does not lose the characteristics such as large capacity and high energy density of sulfur and proceeds the oxidation-reduction reaction rapidly even at room temperature.

Further, the object of the present invention is to provide a composite electrode which does not lose a high energy density of an organic sulfide compound and gives a high charging and discharging efficiency and good charging and discharging cycle life property.

BRIEF SUMMARY OF THE INVENTION

The composite electrode of the present invention comprises a composition which contains an organic sulfide compound with at least a thiol or thiolate group in the molecule, polyaniline, and sulfur.

The composite electrode of the present invention preferably includes an electrically conductive supporting member which carries the above-mentioned composition thereon.

Further, it is preferable that at least the surface of the supporting member is constituted by metallic copper, silver, copper alloy or silver alloy, or that at least the surface of the composition on the supporting member contains a powder of metallic copper, silver, copper alloy or silver alloy.

The method for producing the composite electrode of the present invention comprises the steps of: (a) dissolving an organic sulfide compound having at least a thiol or thiolate group in the molecule into N—R-2-pyrrolidone wherein R is a hydrogen atom or an alkyl group such as $CH_3$, $C_2H_5$ or $n-C_4H_9$ to obtain a solution A, (b) adding and mixing a powder of polyaniline to the solution A, (c) adding and mixing a sulfur powder to the solution A to obtain a slurry, and (d) applying the slurry on an electrically conductive supporting member and, then, heating the member in vacuo (in a vacuum) or under an atmosphere of an inert gas such as argon, nitrogen or the like.

If the composition contains a powder of metallic copper, metallic silver or the like, it is preferable to dissolve the organic sulfide compound into N—R-2-pyrrolidone to obtain a solution A in first, to add and mix a powder of metallic copper, metallic silver or the like to the solution A in second, and to add and mix a polyaniline powder and, then, the sulfur powder in third. Since the addition of polyaniline which may increase viscosity of the solution is carried out after dissolving the organic sulfide compound or adding and mixing a powder of metallic copper, metallic silver or the like, the organic sulfide compound and polyaniline may dissolve into N—R-2-pyrrolidone uniformly and at a high concentration.

DETAILED DESCRIPTION OF THE INVENTION

Figure 1:
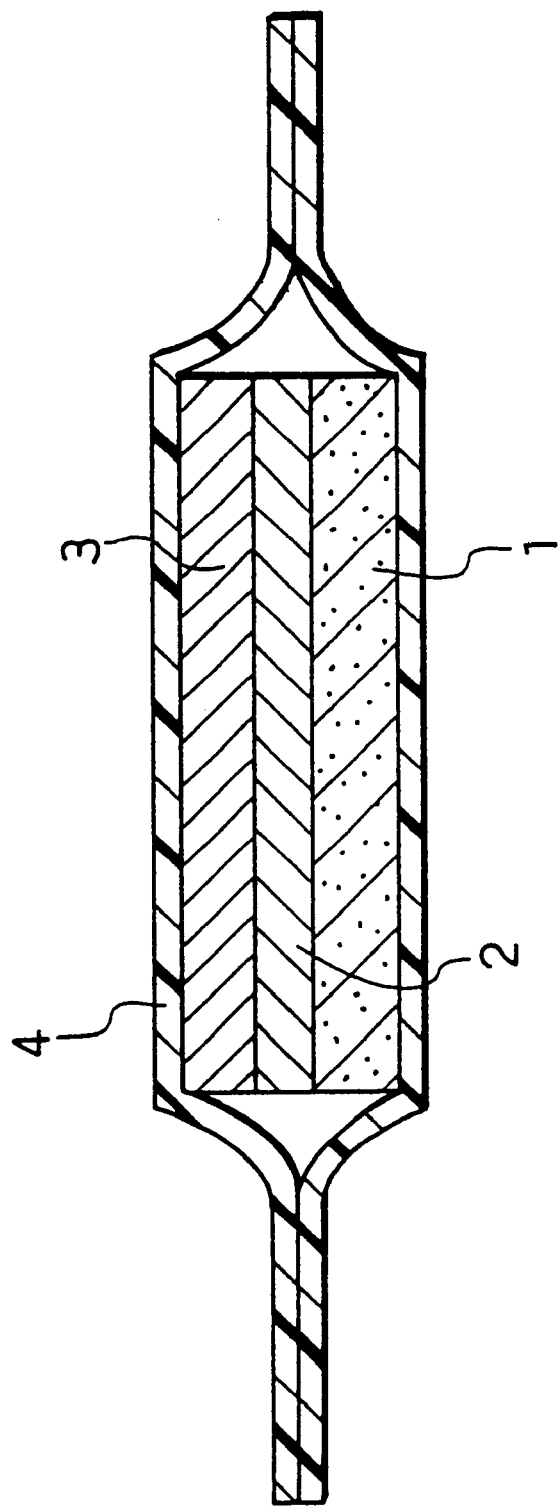
FIG. 1 is a schematic cross-sectional view of a lithium battery which is employed for evaluating performance of the electrode in EXAMPLE of the present invention.

The composite electrode of the present invention may provide a relatively larger capacity than an electrode which comprises only polyaniline (hereinafter, referred to as "PAn") and an organic sulfide compound (hereinafter, referred to as "SS"), because the composite electrode of the present invention contains sulfur. Although the sulfur has a large theoretical capacity of 1,675 Ah/kg, the reversibility in oxidation-reduction reaction is poor at room temperature and the utilization is low, not higher than 20%. When PAn and SS are used together as the composite, however, the utilization becomes high, not lower than 80% and also the reversibility becomes high. On the other hand, only when the sulfur is used with an anode of a metallic lithium, an obtained battery only gives a voltage of 2V. In contrast thereto, if the sulfur, PAn and SS are used together, an obtained battery gives a high voltage of not lower than 3V.

Further, PAn is doped with (poly)thiolate anion from SS or the sulfur to form an electrically conductive material. Therefore, in the composite electrode of the present invention, a transferring path of electrons is formed in molecular level and the oxidation-reduction reaction can proceed smoothly.

Then, a composite electrode having an amount of residual NAP of substantially zero may be obtained by applying a composition, which is obtained by adding and mixing the sulfur into a mixture comprising SS, PAn and N—R-2-pyrrolidone (hereinafter, referred to as "NAP") on the supporting member, followed by heating. Since NAP does not contribute to the oxidation-reduction reaction, a composite electrode having a large capacity per weight may be obtained by controlling the content of NAP to substantially zero.

The metallic copper or metallic silver, which is one component of the composite electrode of the present invention, may give a composite together with PAn and SS and prevent the composite from dissolving into the electrode and dispersing from a cathode. Thus, good charging and discharging cycle life can be given. Further, the composite electrode of the present invention gives a flatter voltage than a composite electrode comprising only PAn and SS.

As the SS, a compound represented by the formula $(R(S)_y)_n$ may be used. R is an organic moiety such as aliphatic, aromatic or heterocyclic residue, S is a sulfur atom, y is an integer of not less than 1, n is an integer of not less than 2. As such compounds, there are, for example, dithioglycol(DTG) represented by $HSCH_2CH_2SH$, 2,5-dimercapto-1,3,4-thiadiazole(DMcT) represented by $C_2N_2S(SH)_2$, s-triazine-2,4,6-trithiol(TTA) represented by $C_3H_3N_3S_3$, 7-methyl-2,6,8-trimercaptopurine(MTMP) represented by $C_6H_6N_4S_3$, 4,5-diamino-2,6-dimercaptopyrimidine(DDPy) represented by $C_4H_6N_4S_2$ and the like. These compounds are commercially available. Also, the SS may be used after polymerizing by means of a chemical polymerization method with an oxidizing agent such as iodine, potassium ferricyanide, hydrogen peroxide or the like or by means of an electrolytic oxidation method. The obtained polymer mixture may contain a dimer and a trimer of the SS and the polymer mixture is also available in the present invention. Further, as the SS, a polycarbon disulfide represented by $(CS_x)_n$ wherein x=0.5 to 2 and n is an integer of not less than 2 may be used.

As the PAn, a polymer obtained by means of a chemical polymerization method or an electrolytic polymerization from aniline or derivatives thereof. In particular, reductive PAn which is in the de-doped state is preferable because the PAn captures an organic disulfide monomer efficiently. The reduction degree index (RDI) of the PAn can be shown by an electron absorption spectrum of a solution which is obtained by dissolving a very small amount of PAn to N-methyl-2-pyrrolidone. Namely, the RDI is represented by RDI=$I_{640}/I_{340}$, the ratio of a peak intensity ($I_{640}$) derived from quinone diimine structure at a longer wavelength side around 640 nm to a peak intensity ($I_{340}$) derived from para-substituted benzen structure at a shorter wavelength side around 340 nm. The PAn having a RDI of not more than 0.5 is preferably used. The degree in the not-doped state of the PAn is represented by the electric conductivity. And, the PAn having an electric conductivity of $10^{-5}$S/cm is preferably used.

As the NAP used in the producing method of the present invention, commercially available one may be used as it is or after treating with a zeolite-type adsorbent to decrease the water content to not more than 20 ppm. Further, pyrrolidone, N-methyl-2-pyrrolidone(NMP), N-ethyl-2-pyrrolidone (NEP), N-butyl-2-pyrrolidone(NBP) and the like may be used.

As the electrically conductive supporting member, a porous carbon film comprising carbon black and a fluorocarbon resin, a metallic foil comprising titanium, aluminum, stainless steel or the like, an electrically conductive polymer film comprising PAn, polypyrrole or the like may be used. Further, the metallic foil and carbon film may be applied or coated by the electrically conductive polymer film.

As the material for the electrically conductive supporting member in the present invention, there are, for example, copper alloy and silver alloy which contains the metal such as gold, indium, tin or lead as well as pure copper and pure silver. When the supporting member is in the form of a foil, the thickness of the foil is preferably 0.1 to 100 μm. Also, a clad comprising copper foil or silver foil with a metal foil laminated thereon may be used. In this case, the metallic foil may comprise titanium, aluminum, stainless steel or the like. Further, the metallic foil of titanium, aluminum or stainless steel may be plated with copper or silver. The surface of the copper foil, the silver foil or the clad may be flat or uneven and may have a plural number of regular or irregular pores.

As the powder of metallic copper or the like which is added to the electrode composition, powdery or fibrous metallic copper, metallic silver, copper alloy and silver alloy may be used. The particle size, fiber diameter or fiber length of the powder is preferably in a range of 100 Å to 10 μm. In addition, a coated material may also be used. Such a coated material is obtained by coating the surface of a particle comprising a synthetic resin such as acrylic resin or the like with copper, silver, copper alloy or silver alloy.

Herein, the sulfur used in the present invention means a pure sulfur in the state of simple substance. Therefore, the sulfur powder used in the present invention preferably has a purity of not less than 99.9% and a particle size of not more than 10 μm.

The mixing amount of the PAn is preferably 0.01 to 10 parts by weight per 1 part by weight of the organic sulfide compound. The mixing amount of the powder of metal copper, copper alloy, silver or silver alloy, which is added to the electrode composition, is preferably 0.01 to 10 parts by weight per 1 part by weight of the total of the organic sulfide compound and the PAn. The amount of the sulfur powder is 0.1 to 10 parts by weight, preferably 0.5 to 2 parts by weight per 1 part by weight of the organic sulfide compound.

The metal cation $M^+$ which is produced by reducing SS to form a salt may be copper cation or silver cation as well as alkali metal cation or alkali earth metal cation which is described in the above-mentioned U.S. Pat. specification.

To the composite electrode of the present invention, an electrically conductive agent can be added for enhancing the electrical conductivity. As such agent, there are, for example, a powder or fiber comprising carbon such as graphite, acetylene black or the like and an electrically conductive polymer such as polypyrrole, polythiophene or the like.

To the composite electrode of the present invention, an electrolyte containing the cation $M^+$ may be added. As the electrode, a polymer electrolyte in the state of solid or semisolid is preferable because the organic sulfide monomer is difficult to disperse and transfer in the electrode. The polymer electrolyte in the state of solid is obtained, for example, by dissolving a lithium salt such as $LiClO_4$, $LiCF_3SO_3$, $LiN(CF_3SO_2)_2$ or the like into polyethylene oxide. The polymer electrolyte in the state of semisolid is obtained, for example, by dissolving a lithium salt such as $LiClO_4$, $LiCF_3SO_3$, $LiBF_4$, $LiPF_6$, $LiN(CF_3SO_2)_2$ or the like into a non-aqueous solvent such as propylene carbonate, ethylene carbonate or the like to obtain a solution and, then, by gelling the solution with a polymer such as polyacrylonitrile, polyvinylidene fluoride, polyacrylic acid, polyethylene oxide or the like. A liquid electrolyte obtained by dissolving about 1M of the above-mentioned lithium salt into NAP may be added.

Further, to improve film forming property and obtain a high film strength, an organic polymer binder such as polyvinyl pyrrolidone, polyvinyl alcohol, polyvinyl pirydine, polyvinylidene fluoride or the like may be added to the composite electrode of the present invention.

The secondary battery of the present invention contains a cathode comprising the above-mentioned composite electrode, a non-aqueous electrolyte, and an anode containing lithium as the active material. As the anode which contains lithium as the active material, metallic lithium, lithium alloy, and a carbon material and a lithium-containing composite oxide in which lithium can be captured and released reversibly may be used.

The present invention is explained by the following examples more in detail but is not limited thereto.

EXAMPLE 1

In first, polyaniline ("ANILEAD" available from Nitto Denko Corp., Japan) was de-doped in an alkali solution and reduced with hydradine to obtain a de-doped and reduced polyaniline powder having an electrical conductivity of $10^{-8}$ S/cm and a RDI of 0.26.

Then, 1.5 g of 2,5-dimercapto-1,3,4-thiadiazole(DMcT) powder, 1.0 g of the de-doped and reduced polyaniline powder, 0.25 g of acetylene black powder, 1.0 g of the sulfur powder and 0.15 g of acrylonitrile/methyl acrylate copolymer powder (copolymerization mole ratio=95/5, number average molecular weight=400,000) were mixed and pulverized to obtain a mixture.

On the other hand, 1M of $LiBF_4$ and 0.5M of $LiPF_6$ were dissolved into an ethylene carbonate/dimethyl carbonate solvent mixture (volume ratio=1:1) to prepare an electrolytic solution. 3.0 g of the electrolytic solution was added to the above-obtained mixture to knead, and the mixture was molded to give a sheet having a thickness of 100 μm by means of a heat press roller at 75° C. This sheet was laminated on a mesh sheet of copper having a thickness of 25 μm and an opening rate of 65% and, then, molded again by means of a heat press roller at 75° C. to obtain a composite electrode sheet having a thickness of 55 μm with the mesh sheet of copper as the core. The obtained composite electrode was cut to 2 cm×2 cm square.

EXAMPLE 2

After dissolving 2.0 g of DMcT powder into 7.0 g of N-methyl-2-pyrrolidone(NMP), 1.0 g of the same de-doped and reduced polyaniline powder as that in Example 1 was dissolved to obtain a viscous DMcT-PAn-NMP solution having a color of Nile blue. To the solution, 1.0 g of the sulfur powder was added and mixed to obtain a slurry. The slurry was applied on the foil of metallic copper having a thickness of 10 μm by means of an applicator with a gap of 150 μm and heating was carried out at 80° C. for 15 minutes under a stream of argon gas and, then, at 70° C. for 60 minutes in vacuo to obtain a composite electrode having a thickness of 35 μm. The obtained composite electrode was cut to 2 cm×2 cm square. The amount of residual NMP in the composite electrode, which was calculated from the difference between the weights of the composite electrodes before and after the heating in vacuo and the amount of NMP, was 0.2 wt % to 100 wt % of the amount of NMP.

EXAMPLE 3

In first, polyaniline ("ANILEAD" available from Nitto Denko Corp., Japan) was de-doped in an alkali solution and reduced with hydradine to obtain a de-doped and reduced polyaniline powder having an electrical conductivity of $10^{-8}$ S/cm and a RDI of 0.30. After dissolving 2.0 g of 4,5-diamino-2,6-dimercaptopyrimidine (DDPy) powder into 7.0 g of NMP, 1.0 g of the polyaniline powder was dissolved and, further, 9.7 g of NMP was added to obtain a DDPy-PAn-NMP solution having a color of Nile blue. Into the solution, 0.25 g of acetylene black and 1.0 g of the sulfur powder were added and mixed uniformly to give a black slurry. The slurry was applied on the foil of metallic copper having a thickness of 30 μm by means of an applicator with a gap of 300 μm and heating was carried out at 80° C. for 15 minutes under a stream of argon gas and, then, at 70° C. for 60 minutes in vacuo to obtain an composite electrode having a thickness of 55 μm. The obtained composite electrode was cut to 2 cm×2 cm square. The amount of residual NMP in the composite electrode, which was calculated in the same manner as in EXAMPLE 2, was 0.1 wt % to 100 wt % of the amount of NMP.

Comparative Example 1

A composite electrode having a thickness of 55 μm was obtained in the same manner as in EXAMPLE 1 except that the sulfur powder was not contained.

Comparative Example 2

A composite electrode having a thickness of 55 μm was obtained in the same manner as in EXAMPLE 1 except that the reduced polyaniline powder was not contained.

Comparative Example 3

A composite electrode having a thickness of 55 μm was obtained in the same manner as in EXAMPLE 1 except that the DMcT powder was not contained.

Comparative Example 4

A composite electrode having a thickness of 35 μm was obtained in the same manner as in EXAMPLE 2 except that the sulfur powder was not contained. The amount of residual NMP in the composite electrode, which was calculated from the difference between the weights of the composite electrodes before and after the heating in vacuo and the amount of NMP, was 12.5 wt % to 100 wt % of the amount of NMP.

Comparative Example 5

A composite electrode having a thickness of 53 μm was obtained in the same manner as in EXAMPLE 3 except that the sulfur powder was not contained. The amount of residual NMP in the composite electrode, which was calculated in the same manner as in EXAMPLE 2, was 11.5 wt % to 100 wt % of the amount of NMP.

Then, lithium batteries having a constitution as shown in FIG. 1 were fabricated by using the electrodes obtained in EXAMPLEs 1 to 3 and COMPARATIVE EXAMPLEs 1 to 5 as their cathodes. In FIG. 1, numeral 1 is a cathode. The cathode 1, a separator layer 2 having a thickness of 0.2 mm comprising a gel electrolyte, and a foil of metallic lithium having a thickness of 0.3 mm were laminated to produce a power generating device of 2 cm×2 cm square. The device was put between two films 4 and sealed air-tightly. The gel electrolyte was prepared by gelling 3.0 g of polyacrylonitrile with 20.7 g of a solution which was obtained by dissolving 1M of $LiBF_4$ and 0.5M of $LiPF_6$ into an ethylene carbonate/dimethyl carbonate solvent mixture (volume ratio=1:1). The film comprised a resin film with aluminum laminated thereon. Leads (not shown in FIG. 1) of the cathode and anode were provided on and drawn from the portion where two films were melted and adhered.

Figure 2:
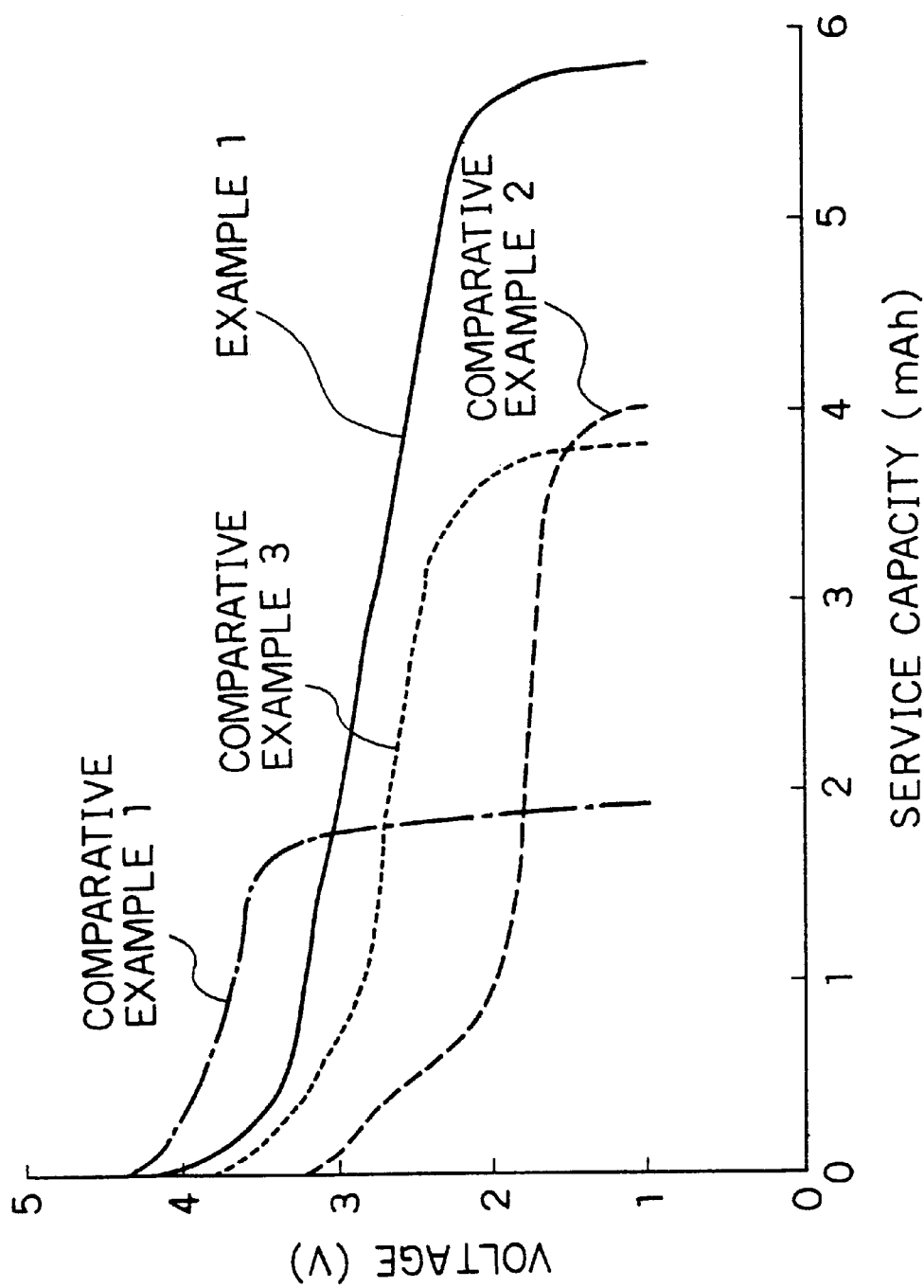
FIG. 2 is a diagram of the discharging curves for each lithium battery with a cathode which comprises each electrode of EXAMPLE 1 and COMPARATIVE EXAMPLEs 1 to 3.

Each of the above-mentioned batteries was charged and discharged repeatedly at a constant current of 1 mA and in a range of 1.0 to 4.35V at 20° C., and the service capacity (unit:mAh) thereof was measured to evaluate the charging and discharging cycle property. The results are shown in Table 1. With respect to the batteries which employ cathodes of EXAMPLE 1 and COMPARATIVE EXAMPLEs 1 to 3, the discharging curves of the fifth charging and discharging cycle are shown in FIG. 2.

TABLE 1

| | Service Capacity (mAh) | | | |
| --- | --- | --- | --- | --- |
| | Number of Charging and Discharging Cycle | | | |
| | 1 | 5 | 30 | 50 |
| Example 1 | 6.0 | 5.8 | 5.5 | 5.3 |
| Example 2 | 5.2 | 4.9 | 4.6 | 4.3 |
| Example 3 | 5.0 | 4.9 | 4.6 | 4.2 |
| Comparative Example 1 | 2.2 | 1.9 | 1.7 | 1.5 |
| Comparative Example 2 | 5.6 | 4.0 | 2.8 | 1.6 |
| Comparative Example 3 | 4.6 | 3.8 | 3.3 | 2.8 |
| Comparative Example 4 | 1.8 | 1.8 | 1.5 | 1.3 |
| Comparative Example 5 | 1.6 | 1.7 | 1.5 | 1.2 |

As apparent from the results in Table 1, the battery using the composite electrode of EXAMPLE 1 according to the present invention has a larger service capacity and a higher voltage and a smaller decrease in service capacity during the charging and discharging cycle than the battery using the composite electrode of each COMPARATIVE EXAMPLE 1 to 3. In the composite electrode of EXAMPLE 2 or 3 according to the present invention, an amount of residual NMP is substantially zero and the electrode does not contain NMP which does not concern (give capacity to) the cell reaction.

EXAMPLE 4

After dissolving 2.0 g of DMCT powder into 7.0 g of NMP, the de-doped and reduced polyaniline powder having an electrical conductivity of $10^{-8}$S/cm and a RDI of 0.26, which was used in EXAMPLE 1, was dissolved to give a viscous DMcT-PAn-NMP solution having a color of Nile blue. Into the solution, 1.0 g of the sulfur powder was added and mixed to obtain a slurry. The slurry was applied on the foil of metallic copper having a thickness of 10 μm by means of an applicator with a gap of 150 μm and heating was carried out at 80° C. for 15 minutes under a stream of argon gas and, then, at 70° C. for 60 minutes in vacuo to obtain a composite electrode having a thickness of 35 μm. The obtained composite electrode was cut to 2 cm×2 cm square. The amount of residual NMP in the composite electrode, which was calculated in the same manner as in EXAMPLE 2, was 0.2 wt % to 100 wt % of the charging amount of NMP.

EXAMPLE 5

After dissolving 2.0 g of DMcT powder into 7.0 g of NMP and 1.0 g of the same de-doped and reduced polyaniline powder as that in EXAMPLE 3, which had an electrical conductivity of $10^{-8}$S/cm and a RDI of 0.30, 9.7 g of NMP was dissolved to obtain a DMcT-PAn-NMP solution having a color of Nile blue. Into the solution, 0.25 g of acetylene black powder and 1.0 g of the sulfur powder were added and mixed uniformly to give a black slurry. The black slurry was applied on the foil of metallic copper having a thickness of 30 μm by means of an applicator with a gap of 250 μm and heating was carried out at 80° C. for 15 minutes under a stream of argon gas and, then, at 70° C. for 60 minutes in vacuo to obtain a composite electrode having a thickness of 55 μm. The obtained composite electrode was cut to 2 cm×2 cm square. The amount of residual NMP in the composite electrode, which was calculated in the same manner as in EXAMPLE 2, was 0.1 wt % to 100 wt % of the amount of NMP.

EXAMPLE 6

In first, polyaniline ("ANILEAD" available from Nitto Denko Corp., Japan) was de-doped in an alkali solution and reduced with hydradine to obtain a de-doped and reduced polyaniline powder having an electrical conductivity of $10^{-8}$ S/cm and a RDI of 0.18.

After dissolving 1.5 g of s-triadine-2,4,6-trithiole (TTA) powder into 7.5 g of NMP, further 1.0 g of the polyaniline powder was dissolved to obtain a TTA-PAn-NMP solution. Into the solution, 0.5 g of acetylene black powder and 1.0 g of the sulfur powder were added and mixed uniformly to give a black slurry. The black slurry was applied on the foil of metallic copper having a thickness of 30 $\mu$m by means of an applicator with a gap of 250 $\mu$m and heating was carried out at 80° C. for 15 minutes under a stream of argon gas and, then, at 80° C. for 60 minutes in vacuo to obtain a composite electrode having a thickness of 58 $\mu$m. The obtained composite electrode was cut to 2 cm×2 cm square. The amount of residual NMP in the composite electrode, which was calculated in the same manner as in EXAMPLE 2, was 0.05 wt % to 100 wt % of the amount of NMP.

EXAMPLE 7

In first, polyaniline ("ANILEAD" available from Nitto Denko Corp., Japan) was de-doped in an alkali solution and reduced with hydradine to obtain a de-doped and reduced polyaniline powder having an electrical conductivity of $10^{-8}$ S/cm and a RDI of 0.28.

2.0 g of DMcT was dissolved into 7.0 g of NMP to obtain a DMcT-NMP solution. Into the solution, 0.5 g of metallic copper powder having an average particle size of 1 $\mu$m was added to give a mixture having a color of red slightly. Into the mixture, 1.0 g of the polyanline powder was added into the composition to dissolve. Further, 1.0 g of the sulfur powder was admixed thereto. The obtained mixture was applied on the foil of titanium having a thickness of 10 $\mu$m by means of an applicator with a gap of 150 $\mu$m and heating was carried out at 80° C. for 15 minutes under a stream of argon gas and, then, at 80° C. for 60 minutes under a reduced pressure of 1 cmHg to obtain a composite electrode having a thickness of 35 $\mu$m. The obtained composite electrode was cut to 2 cm×2 cm square. The amount of residual NMP in the composite electrode, which was calculated in the same manner as in EXAMPLE 2, was 0.05 wt % to 100 wt % of the amount of NMP.

EXAMPLE 8

A composite electrode of the present invention having a thickness of 35 $\mu$m was produced in the same manner as in EXAMPLE 4 except that a copper foil having a thickness of 10 $\mu$m with a silver layer plated thereon was used as the foil. The plated silver layer had a thickness of about 2000 Å and the laminated foil was formed by a non-electrolytic plating method. The amount of residual NMP in the composite electrode, which was calculated in the same manner as in EXAMPLE 2, was 0.15 wt % to 100 wt % of the amount of NMP.

EXAMPLE 9

A composite electrode of the present invention having a thickness of 55 $\mu$m was produced in the same manner as in EXAMPLE 5 except that a copper foil having a thickness of 30 $\mu$m with a plated silver layer having a thickness of about 1 mm laminated thereon was used as the foil. The plated silver layer was laminated by a non-electrolytic plating method. The amount of residual NMP in the composite electrode, which was calculated in the same manner as in EXAMPLE 2, was 0.1 wt % to 100 wt % of the amount of NMP.

EXAMPLE 10

A composite electrode of the present invention having a thickness of 62 $\mu$m was produced in the same manner as in EXAMPLE 6 except that a copper foil a thickness of 30 $\mu$m with a plated silver layer having a thickness of about 2.5 $\mu$m laminated thereon was used as the foil. The plated silver layer was laminated thereon by a non-electrolytic plating method. The amount of residual NMP in the composite electrode, which was calculated in the same manner as in EXAMPLE 2, was 0.05 wt % to 100 wt % of the amount of NMP.

EXAMPLE 11

A composite electrode having a thickness of 35 $\mu$m was obtained in the same manner as in EXAMPLE 7 except that a metallic silver powder having an average particle size of 1.5 $\mu$m was used instead of the metallic copper powder having an average particle size of 1 $\mu$m.

Comparative Example 6

A composite electrode having a thickness of 35 $\mu$m was obtained in the same manner as in EXAMPLE 4 or 8 except that a titanium foil having a thickness of 10 $\mu$m was used instead of the foil of copper or the copper foil with a plated silver layer laminated thereon. The amount of residual NMP in the composite electrode, which was calculated in the same manner as in EXAMPLE 2, was 0.5 wt % to 100 wt % of the amount of NMP.

Comparative Example 7

A composite electrode having a thickness of 35 $\mu$m was obtained in the same manner as in EXAMPLE 4 or 8 except that the sulfur powder was not contained. The amount of residual NMP in the composite electrode, which was calculated in the same manner as in EXAMPLE 2, was 12.5 wt % to 100 wt % of the amount of NMP.

Comparative Example 8

A composite electrode having a thickness of 55 $\mu$m was obtained in the same manner as in EXAMPLE 5 or 9 except that a titanium foil having a thickness of 30 $\mu$m was used instead of the foil of metallic copper or the copper foil with a plated silver layer laminated thereon. The amount of residual NMP in the composite electrode, which was calculated in the same manner as in EXAMPLE 2, was 0.6 wt % to 100 wt % of the amount of NMP.

Comparative Example 9

A composite electrode having a thickness of 32 $\mu$m was obtained in the same manner as in EXAMPLE 5 or 9 except that the sulfur powder was not contained. The amount of residual NMP in the composite electrode, which was calculated in the same manner as in EXAMPLE 2, was 13.0 wt % to 100 wt % of the amount of NMP.

Comparative Example 10

A composite electrode having a thickness of 55 $\mu$m was obtained in the same manner as in EXAMPLE 6 or 10 except that a titanium foil of 30 μm thickness was used as the foil instead of instead of the foil of metallic copper or the copper foil with a plated silver layer laminated thereon. The amount of residual NMP in the composite electrode, which was calculated in the same manner as in EXAMPLE 2, was 1.2 wt % to 100 wt % of the amount of NMP.

Comparative Example 11

A composite electrode having a thickness of 53 μm was obtained in the same manner as in EXAMPLE 5 or 9 except that the sulfur powder was not contained. The amount of residual NMP in the composite electrode, which was calculated in the same manner as in EXAMPLE 2, was 10.5 wt % to 100 wt % of the amount of NMP.

Comparative Example 12

A composite electrode having a thickness of 35 μm was obtained in the same manner as in EXAMPLE 11 except that a mixture containing no metallic copper powder or no metal silver powder. The amount of residual NMP in the composite electrode, which was calculated in the same manner as in EXAMPLE 2, was 0.4 wt % to 100 wt % of the amount of NMP.

Comparative Example 13

A composite electrode having a thickness of 32 μm was obtained in the same manner as in EXAMPLE 7 or 11 except that the sulfur powder was not contained. The amount of residual NMP in the composite electrode, which was calculated in the same manner as in EXAMPLE 2, was 9.5 wt % to 100 wt % of the amount of NMP.

Then, lithium batteries having a constitution as shown in FIG. 1 were fabricated by using the electrodes obtained in EXAMPLEs 4 to 11 and COMPARATIVE EXAMPLEs 6 to 13 as their cathodes. The gel electrolyte was prepared by gelling 3.0 g of polyacrylonitrile with 20.7 g of a solution which was obtained by dissolving 1M of $LiBF_4$ and 0.3M of $LiPF_6$ into an ethylene carbonate/dimethyl carbonate solvent mixture (volume ratio=1:1).

Figure 3:
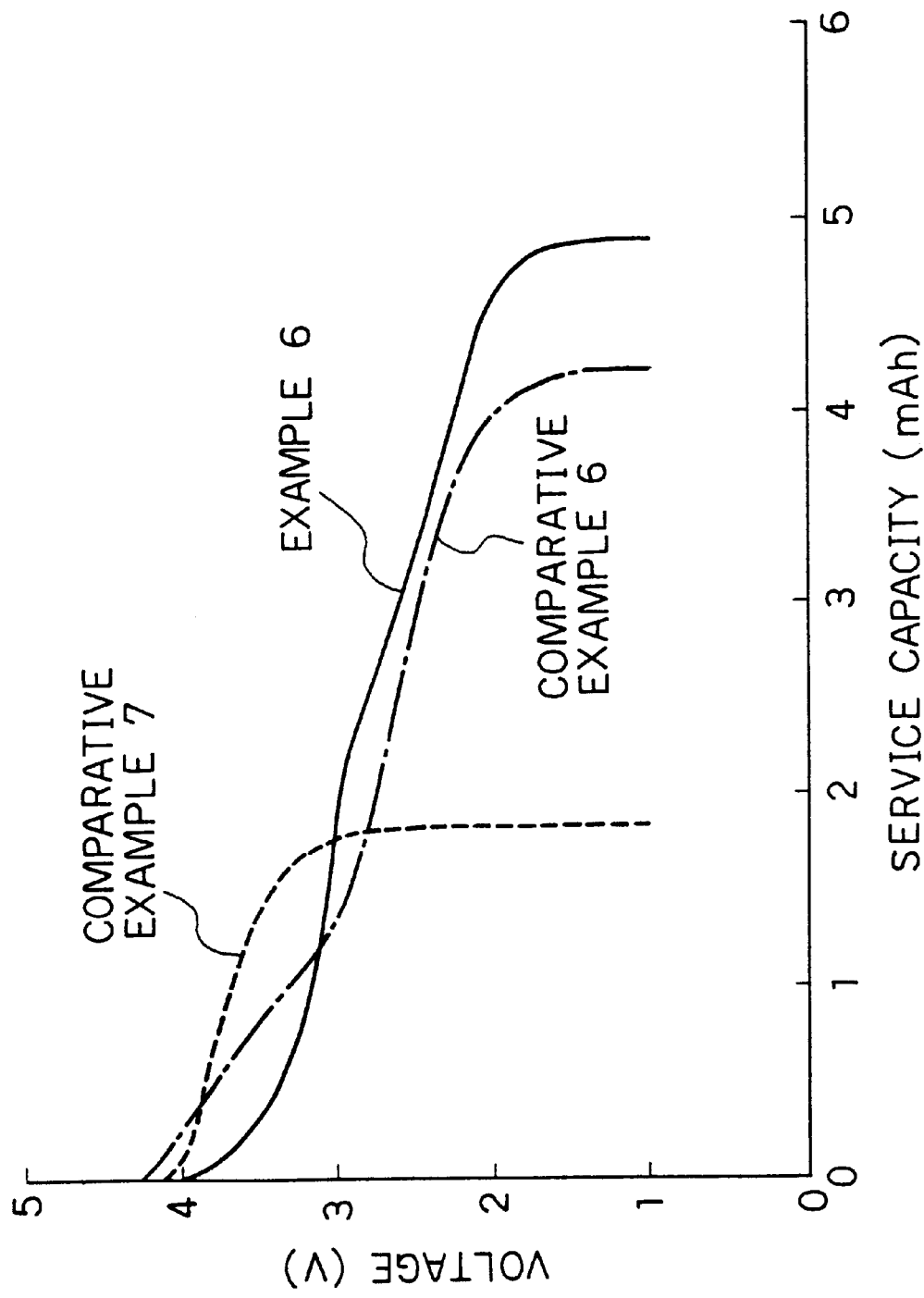
FIG. 3 is a diagram of the discharging curves for each lithium battery with a cathode which comprises each electrode of EXAMPLE 4, COMPARATIVE EXAMPLEs 6 and 7.

Each of the above-mentioned batteries was charged and discharged repeatedly at a constant current of 1 mA and in a range of 1.0 to 4.35V at 20° C., and the service capacity (unit:mAh) thereof was measured to evaluate the charging and discharging cycle property. The results are shown in Table 2. With respect to the batteries which employs cathodes of EXAMPLE 4, COMPARATIVE EXAMPLEs 6 and 7, the discharging curves of the fifth charging and discharging cycle are shown in FIG. 3.

TABLE 2

| | Service Capacity (mAh) | | | |
| | Number of Charging and Discharging Cycle | | | |
| | 1 | 5 | 30 | 50 |
|---|---|---|---|---|
| Example 4 | 5.2 | 4.9 | 4.6 | 4.3 |
| Example 5 | 4.8 | 4.5 | 4.2 | 3.8 |
| Example 6 | 5.6 | 5.1 | 4.8 | 4.2 |
| Example 7 | 4.9 | 5.1 | 4.7 | 4.5 |
| Example 8 | 5.5 | 5.2 | 4.8 | 4.5 |
| Example 9 | 4.8 | 4.6 | 4.3 | 4.0 |
| Example 10 | 5.8 | 5.3 | 5.0 | 4.5 |

TABLE 2-continued

| | Service Capacity (mAh) | | | |
| | Number of Charging and Discharging Cycle | | | |
| | 1 | 5 | 30 | 50 |
|---|---|---|---|---|
| Example 11 | 5.0 | 4.8 | 4.6 | 4.4 |
| Comparative Example 6 | 4.8 | 4.2 | 3.3 | 2.2 |
| Comparative Example 7 | 1.8 | 1.8 | 1.5 | 1.3 |
| Comparative Example 8 | 4.5 | 4.0 | 3.2 | 2.0 |
| Comparative Example 9 | 1.6 | 1.7 | 1.4 | 1.2 |
| Comparative Example 10 | 5.3 | 4.4 | 3.4 | 2.4 |
| Comparative Example 11 | 2.1 | 1.8 | 1.6 | 1.5 |
| Comparative Example 12 | 4.6 | 4.1 | 3.4 | 2.3 |
| Comparative Example 13 | 1.7 | 1.6 | 1.5 | 1.3 |

As apparent from the results in Table 2, the battery using the composite electrode according to the present invention has a larger service capacity, a higher voltage and a smaller decrease in service capacity during charging and discharging cycle than the battery using the composite electrode of each COMPARATIVE EXAMPLE.

The composite electrode of the present invention provides a battery which has a larger service capacity and a higher voltage than the conventional secondary battery. Further, the composite electrode of the present invention provides a secondary battery of a high energy density, in which dispersing of the cathode active material during the charging and discharging cycle is reduced and decrease in service capacity during the charging and discharging cycle is small.

Although the composite electrode of the present invention was applied only to the battery in the above-mentioned EXAMPLEs, the electrode may provides an electrochromic device having a high coloring and discoloring rate, a biochemical sensor such as glucose or the like having a high responding rate, or the like. Also, an electrochemical analogue memory having a high reading and writing rate may be obtained.

What is claimed is:

1. A composite electrode comprising a composition which contains sulfur, polyaniline and an organic sulfide compound having at least one thiol or thiolate group in the molecule and which is carried on a supporting member at least, the surface of which comprises a metal selected from the group consisting of metallic copper, silver, copper alloy and silver alloy.

2. A composite electrode comprising:

a composition which contains sulfur, polyaniline, an organic sulfide compound having at least a thiol or thiolate group in the molecule and a powder selected from the group consisting of metallic copper, silver, copper alloy and silver alloy; and an electrically conductive supporting member on which the composition is carried.

3. A lithium secondary battery which comprises a composite electrode in accordance with claim 1, an anode containing lithium as the active material, and a non-aqueous electrolyte.

* * * * *